Jan. 24, 1939.   W. KING   2,144,924
BREAD-SLICE-GREASING MACHINE
Filed June 29, 1936   2 Sheets-Sheet 1
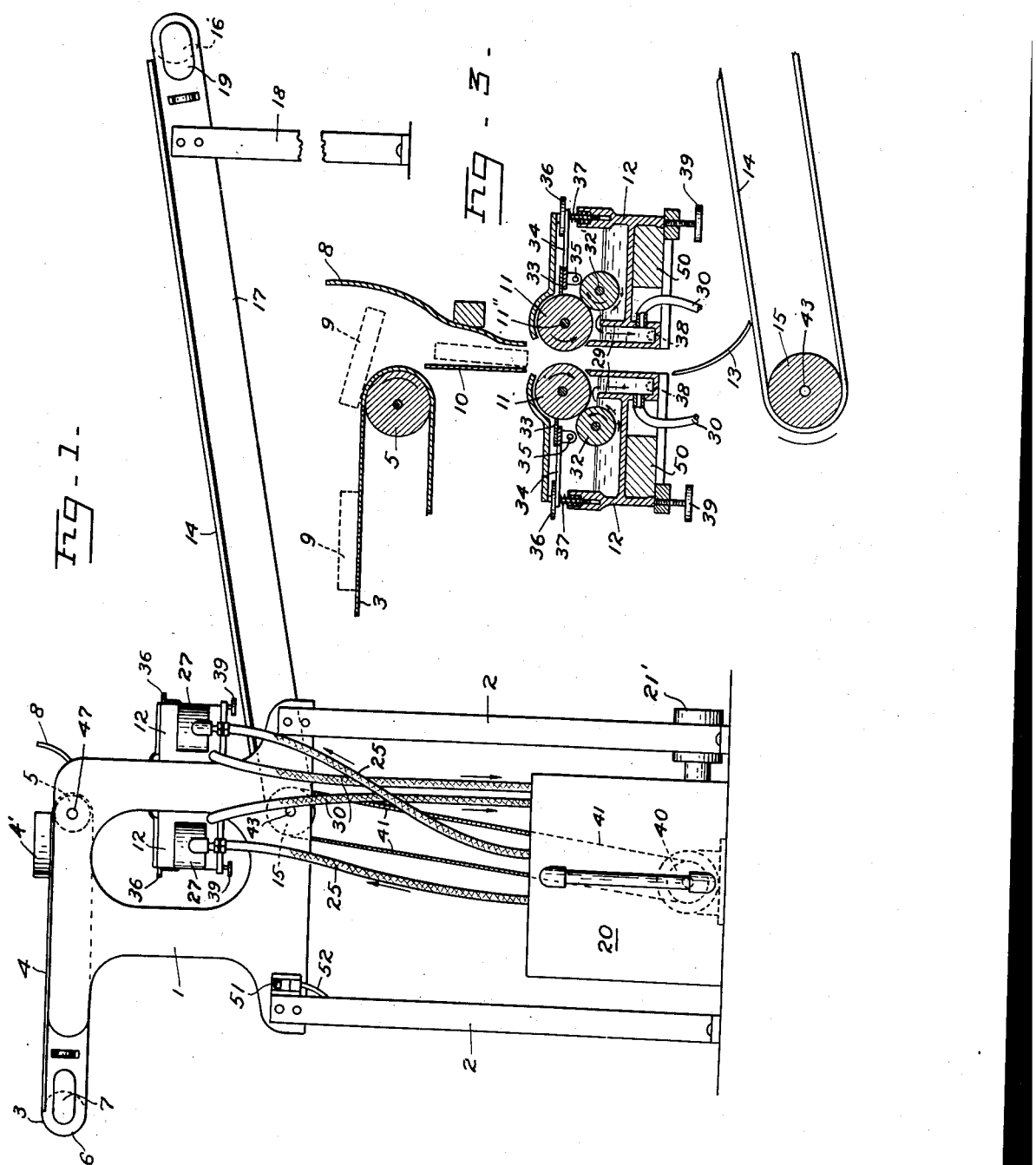
INVENTOR.
WALTER KING
BY *Miller Boyken & Bried*
ATTORNEY.

Jan. 24, 1939.   W. KING   2,144,924
BREAD-SLICE GREASING MACHINE
Filed June 29, 1936   2 Sheets-Sheet 2
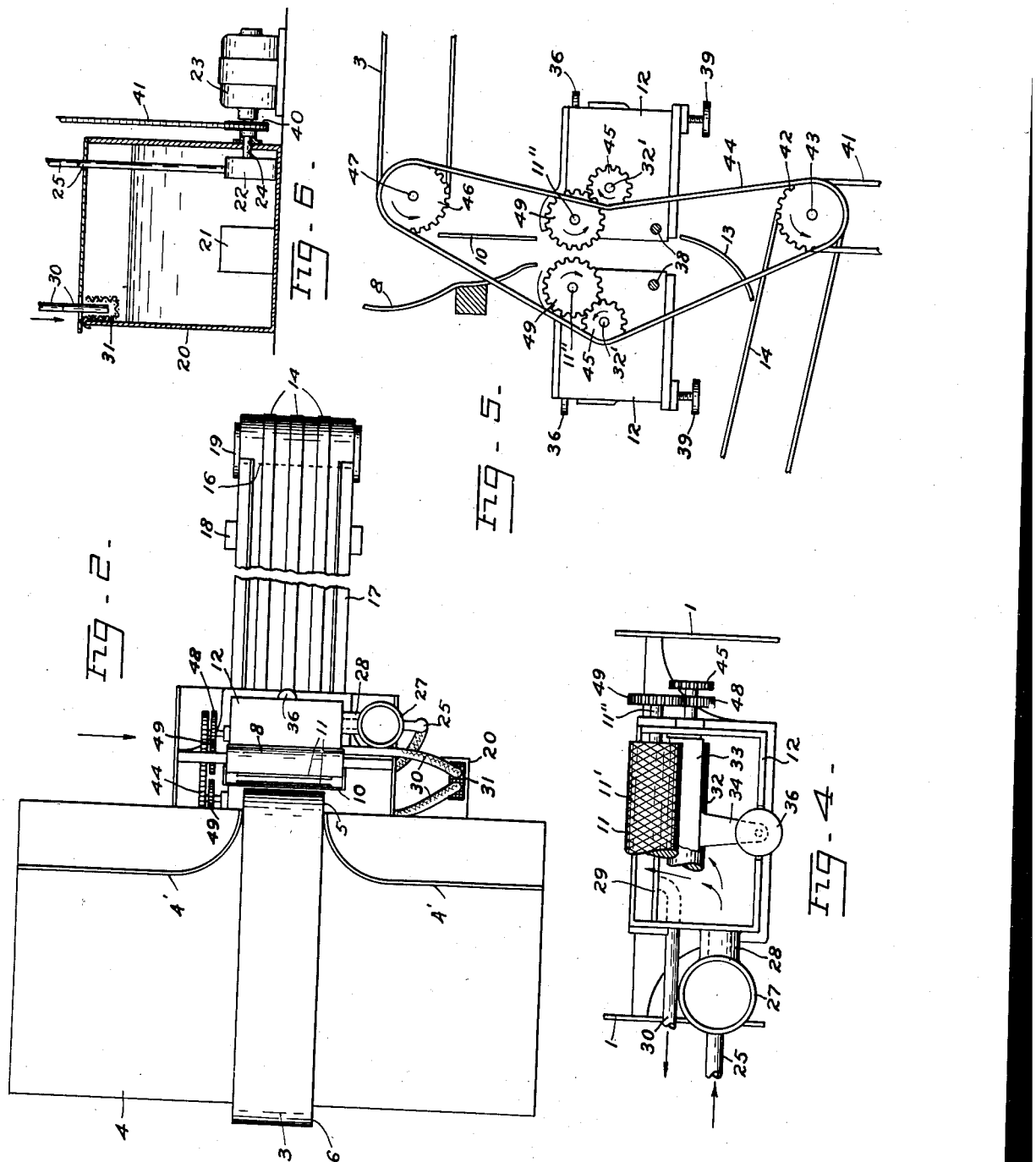
INVENTOR.
WALTER KING
BY Miller Boyken & Bried
ATTORNEY.

Patented Jan. 24, 1939

2,144,924

UNITED STATES PATENT OFFICE 2,144,924

BREAD-SLICE GREASING MACHINE

Walter King, San Francisco, Calif., assignor to Langendorf United Bakeries, Inc., San Francisco, Calif., a corporation of Delaware Application June 29, 1936, Serial No. 87,962

4 Claims. (Cl. 91—50)

This invention relates to the manufacture of bread toast on a commercial scale in which the bread slices are toasted between hot plates or dies carried on an endless conveyor through the oven. The principal object of the invention is to provide mechanical means for applying a coating of grease, oil, or other shortening or liquid preparations to opposite sides of each slice of bread just before it is introduced into the toasting die plates to reduce the tendency of the toast to stick to the hot plates, as well as to aid in securing an even toasting effect and also enhance the flavor of the resulting toast. Other objects and advantages of the invention will appear in the following description and accompanying drawings.

In the drawings, Fig. 1, is a side elevation of the machine.

Fig. 2 is a plan view of the machine proper, but with its discharge conveyor shown broken in length.

Fig. 3 is an enlarged cross section of the greasing rolls in the grease fountains.

Fig. 4 is a plan view of one of the greasing rolls and its fountain, with parts broken away to better indicate the flow of liquid grease.

Fig. 5 is a partial side view of Fig. 2, looking in direction indicated by the arrow showing the roll and conveyor drive.

Fig. 6 is an elevation partly broken away, showing the grease heating tank and pump.

Before going into a detailed description of the drawings, the invention may be briefly described as a machine provided with a belt conveyor which delivers slices of bread in single layer to pass between a pair of greasing rolls running in a receptacle of warmed grease or oil in a manner to deposit a layer of the grease on both sides of each slice, and after which the slices are carried laterally by another conveyor and discharged from the machine.

The features of importance are the arrangement of the cooperating members, the mounting of the greasing rolls, the control of the liquid grease and the associated details which makes the results operative.

In further detail the machine comprises a main supporting frame 1, with floor legs 2, a horizontally arranged belt conveyor 3, and at both sides of which is a table-like shelf 4, preferably with guard rail 4' at rear edge, and between which shelves the conveyor is positioned with the upper rim of its belt substantially flush supported by revolvably mounted rolls 5 and 6 at opposite ends and the latter preferably fitted with take-up boxes 7, so that the belt may be kept in proper operative tension.

Spaced outwardly in front of the discharge end roll 5 is a curved sheet metal guide plate 8 to guide slices of bread 9 edgewise vertically downward between this guide and a cooperating guide plate 10 for direction between a pair of spaced greasing rolls 11 revolvably mounted, each in a separate grease container or fountain 12 which take the form of covered rectangular metal boxes between opposite ends of which rolls 11 are mounted close to the upper confronting carriers so that the rolls project slightly beyond the vertical walls of their respective fountains to engage the bread slices as they fall through the guides 8 and 10, and after passing between the greasing rolls the slices are guided to substantially horizontal position by a plate 13 onto a slightly inclined discharge conveyor 14.

The discharge conveyor consists of several endless metal tapes 14 carried over rollers 15 and 16 at opposite ends supported on an extension frame 17, the outer end of which is supported on floor legs 18 and the outer roll 16 is preferably carried in adjustable bearings 19 for properly tensioning the tapes. The discharge conveyor may deliver the greased slices of bread to the toasting machine not shown.

The grease for coating the bread slices preparatory to toasting may be liquid oil or one such as coconut oil butter or other mixtures, flavored and/or seasoned, or not but which normally require heating to render them sufficiently fluid for pumping and handling in the greasing fountain, and to meet which conditions a relatively large grease or oil reservoir 20 is provided at the base of the machine and fitted inside with any desired type of electrical heater 21 preferably with thermostat control 21' for maintaining the grease in melted condition and at any definite temperature desired. A pump 22, preferably positioned within the reservoir, operated by a motor 23 through means of a shaft 24 extending into the reservoir through a suitable stuffing box pumps the liquid fat or oil up through flexible pipes 25, 25 respectively into cups 27 which open each through a fitting 28 into one of the fountains 12 and wherein the liquid is maintained at a certain level by means of a baffle wall 29 over which it flows to a lower chamber and out through flexible hose pipes 30 to drain back into the reservoir 20 after first passing through a removable strainer 31 which serves to catch bread crumbs getting into the oil from the slices of bread passing between the greasing rolls. The grease fountains may be kept warm by means of suitable electric heating elements 50 arranged against their bottom walls.

The greasing rolls 11 are preferably of metal and have a knurled surface as indicated at 11' in Fig. 4 so that they will carry more oil and will also grip the slices of bread as they come along. Rolls 11, each roll in contact with a submerged oil supply roll 32 so arranged within the fountain that the entering oil from fitting 28 must follow the path indicated in Fig. 3 to flow over baffle 29 and will therefore continually wash the crumbs from the surface of roll 11 as the bread slices pass.

To control the amount of grease or oil carried by rolls 11 to the bread slices, each is provided with a knife blade or doctor 33 carried on a lever frame 34 pivoted at 35 to the end walls of the fountain, and which "doctor" may be adjusted toward or from roll 11 as by means of a screw 36 operating against a spring 37 normally pushing the outer end of frame 34 upward.

The fountains are pivoted at 38 for bodily tipping to adjust the distance between the greasing rolls to suit the slice of bread, and are adjusted on their pivots as by thumb screws 39.

The conveyors, and the greasing rolls 11, are all preferably driven by the motor 23 which also drives the oil or grease pump by any suitable arrangement of gears, chains and sprockets, and here indicated as by a sprocket 40 on the motor, through chain 41 to a sprocket 42 on shaft 43 of discharge conveyor 14, thence from similar sprockets on this shaft by chain 44 over sprockets 45 to a sprocket 46 on shaft 47 of roll 5 of conveyor 3. Sprockets 45 are secured on the outer ends of axles 32' of the grease supply rolls 32 respectively and behind each sprocket is a gear 48 (Fig. 4) meshing with a gear 49 secured to the axle 11" of a greasing roll 11.

In operation, the machine is started by a suitable switch 51 on an extension 52 of the motor circuit, and an operative to the left of the machine has a supply of bread slices piled on tables 4 and places them in single file upon conveyor 3 from which they are turned vertically by guides 8 and 10 to pass vertically to the greasing rolls 11' which gently squeeze the slices and draw the slices through while giving both sides a coat of grease, and after which the slice is turned by curved guide 13 and deposited flat on discharge conveyor 14 and carried away from the machine.

From the foregoing description of the machine and its mode of operation it will be evident to anyone skilled in the art that instead of the belts and rolls of the machine being of a width to handle but one bread slice after another, they may be wider so as to handle any number of slices side by side. Also that changes in the construction may be made within the spirit of the invention and scope of my appended claims.

I claim:

1. A machine of the character described comprising a table, an endless conveyor arranged substantially in the plane of the table and of a size to receive slices of bread lying flat thereon, guiding means at the discharge end of the conveyor arranged to turn the slices and drop them edgewise, a pair of greasing rolls arranged below the discharge end of said conveyor in a manner to receive the slices for passage between them, a laterally extending endless conveyor arranged below said rolls, means turning the slices after passing the rolls to flat position upon said laterally extending conveyor, means applying a layer of liquid grease to said rolls, and means for operating the conveyors and rolls.

2. In a bread slide greasing machine, a pair of spaced greasing rolls between which the bread slices pass to receive a coat of grease, a pair of spaced liquid grease reservoirs on which said rolls are respectively mounted for rotation and in overhanging relation to confronting sides of said reservoirs, means pivotally supporting at least one of said reservoirs on an axis parallel with but spaced from its greasing roll, and means for adjustably tilting the reservoir about said axis to vary the spacing of the greasing rolls.

3. In the construction as specified in claim 2 the surfaces of said greasing rolls being knurled to carry a heavier layer of grease.

4. Means for treating slices of bread comprising; means for moving the bread slices along a path of travel, means providing uniformly spaced opposed greasing surfaces at a predetermined point along said path for receiving said slices in the space therebetween and slightly compressing said slices to reduced substantially uniform thickness while said slices move along said path, a supply of heated grease, and means for supplying heated grease from said supply to said surfaces whereby the slices of bread are simultaneously greased on opposite sides and means for conducting bread crumbs that may fall from said surfaces away from said surfaces and from said supply for maintaining said supply substantially free from crumbs.

WALTER KING.